(12) United States Patent
Munje et al.

(10) Patent No.: US 9,128,937 B2
(45) Date of Patent: Sep. 8, 2015

(54) APPARATUS AND METHOD FOR CREATING, ADDRESSING AND MODIFYING RELATED DATA

(75) Inventors: Arun Munje, Ottawa (CA); Shailesh Kaul, Ottawa (CA)

(73) Assignee: Vayyoo Inc., Ottawa (CA)

( * ) Notice: Subject to any disclaimer, the term of this patent is extended or adjusted under 35 U.S.C. 154(b) by 487 days.

(21) Appl. No.: 12/505,988

(22) Filed: Jul. 20, 2009

(65) Prior Publication Data

US 2010/0017433 A1 Jan. 21, 2010

Related U.S. Application Data

(60) Provisional application No. 61/081,830, filed on Jul. 18, 2008.

(51) Int. Cl.
G06F 17/30 (2006.01)
(52) U.S. Cl.
CPC .................................. *G06F 17/3002* (2013.01)
(58) Field of Classification Search
CPC ................................................ G06F 17/30241
USPC .......................................................... 707/769
See application file for complete search history.

(56) References Cited

U.S. PATENT DOCUMENTS

| | | | |
|---|---|---|---|
| 6,741,864 B2 | 5/2004 | Wilcock et al. | |
| 6,914,626 B2 | 7/2005 | Squibbs | |
| 7,302,254 B2 | 11/2007 | Valloppillil | |
| 7,305,354 B2 | 12/2007 | Rodriguez | |
| 7,818,336 B1* | 10/2010 | Amidon et al. | 707/769 |
| 7,945,470 B1* | 5/2011 | Cohen et al. | 455/433 |
| 2002/0087622 A1 | 7/2002 | Anderson | |
| 2004/0054711 A1 | 3/2004 | Multer | |
| 2004/0250205 A1 | 12/2004 | Conning | |
| 2005/0278371 A1 | 12/2005 | Funk | |
| 2007/0035612 A1* | 2/2007 | Korneluk et al. | 348/14.01 |
| 2007/0229678 A1* | 10/2007 | Barrus et al. | 348/231.3 |
| 2008/0052349 A1* | 2/2008 | Lin | 709/203 |
| 2008/0082405 A1* | 4/2008 | Martinez et al. | 705/14 |
| 2008/0239329 A1 | 10/2008 | Kitada et al. | |
| 2009/0005010 A1* | 1/2009 | Dote et al. | 455/412.1 |
| 2009/0037519 A1 | 2/2009 | Young | |
| 2009/0100070 A1 | 4/2009 | Quartararo | |
| 2009/0204885 A1 | 8/2009 | Ellsworth et al. | |
| 2010/0058217 A1 | 3/2010 | Munje et al. | |

OTHER PUBLICATIONS

Mitch Bartlett, iPhone: How to Send MMS Text Message, Aug. 22, 2009.
McKillop, "How to automatically upload pictures from your mobile phone to Flickr", Oct. 1, 2007, http://www.simplehelp.net/2007/10/01/how-to-automatically-upload-pictures-from-your-mobile-phone-to-flickr/.
Trapani, "Geek to Live: Flickr Advanced User Guide", Feb. 15, 2006, http://lifehacker.com/154849/geek-to-to-live-flickr-advance-user-guide.

(Continued)

*Primary Examiner* — Apu Mofiz
*Assistant Examiner* — Cindy Nguyen

(57) ABSTRACT

A method for creating a structured data collection comprising collecting at least two data components using a data capture device assigning the same unique identifier to all of the data components whereby the items of data identified by the same unique identifier form a bundle of data.

21 Claims, 3 Drawing Sheets

(56) References Cited

OTHER PUBLICATIONS

Trapani, "Tips for Fliokr beginners", Feb. 2, 2005, http://lifehacker.com/31935/tips-for-flickr-beginners.

flickr.com, "Help | FAQ | Photos", Mar. 19, 2007, http://web.archive.org/web/20070319181829/http://www.flickr.com/help/photos/.

eHow.com, "How to Upload Photos on Flickr", Jan. 23, 2008, http://web.archive.org/web/20080123114515/http://www.ehow.com/how_2031218_upload-photos-flickr.html.

wikipedia.org, "Photo sharing", Oct. 12, 2007, http://web.archive.org/web/20071O12230834/http://en.wikipedia.org/wiki/Photo_sharing.

wikipecila.org. "Comparison of photo gallery software", Dec. 2, 2007, http://web.archive.org/web/20071202082335/http://en.wikipedia.org/wiki/Comparison_of_photo_gallery_software.

Office Action dated Oct. 23, 2014 for U.S. Appl. No. 12/505,382.
Office Action dated Mar. 6, 2014 for U.S. Appl. No. 12/505,382.
Office Action dated Jun. 13, 2014 for U.S. Appl. No. 12/505,382.
Office Action dated Jul. 12, 2014 for U.S. Appl. No. 12/505,382.
Office Action dated Dec. 29, 2014 for U.S. Appl. No. 12/505,382.

\* cited by examiner

APPARATUS AND METHOD FOR CREATING, ADDRESSING AND MODIFYING RELATED DATA

CROSS-REFERENCE TO RELATED APPLICATIONS

This application claims benefit from U.S. Provisional Patent Application No. 61/081,830 filed Jul. 18, 2008 for an apparatus and method for creating, addressing and modifying related data.

MICROFICHE APPENDIX

Not applicable.

TECHNICAL FIELD

This application relates to creating a new "data pack" that bundles related data, and provides an auditable and searchable record of more useful data than the independent data it consists of. The application also relates to an apparatus and method for creating, addressing and modifying related data which is particularly useful for devices that are capable of capturing multiple kinds of data and make it easy to correlate them.

BACKGROUND OF THE APPLICATION

As the technology develops creating newer types of data, and there are more ways to capture these, the amount of data is also increasing. Relating the related data is becoming more and more challenging, and it is clear that the value of data can increase significantly if it is correlated with more information.

Consequently, there is a need for an apparatus and method for creating, addressing and modifying related data, some embodiments of which at least enable the better managed and traceable data.

SUMMARY

In one aspect, the present invention relates to a method suitable for creating a structured data collection using a data capture device. The method can further include the step of automatically populating data and Meta Data for the collection, the step of a user manually providing data to be included in the DataPack, or the step of providing another component collecting data as data to be included in the DataPack.

In another aspect, the present inventions relates to a method suitable for assigning a unique identifier to the DataPack bundle. The uniqueness of the identifier is an important aspect for addressability of the DataPack. In order to achieve the uniqueness, the identifier could be based on the combination of the timestamp of when the DataPack was created; a unique identifier of the data capture device itself, e.g. IMEI or BlackBerry Device PIN; or any unique identifier retrieved from the user account of the user of the device. It is also possible to include an identifier assigned by a server that it can communicate with. Either a hash of the above sources of the identifier may be used, or a simple combination of the keys can be used.

The DataPack created can be bundled in a number of different ways, where the individual parts of the bundle are easily identified as being part of the bundle. Examples of bundling according to the present invention include keeping the attachments and related information of the bundle with a folder named using a DataPack identifier. Other representation could be with XML that supports binary data as well. Embodiments of the present invention include a binary stream of data that has predefined types with known lengths, which optimizes parsing and at the same time optimizes total binary size to be suitable for wireless environment.

In another aspect, the present invention relates to a method suitable for updating content of the structured data using a data capture device and the method step of automatically populating data and Meta Data for the collection, the step of a user manually providing data to be included in the DataPack, or the step of providing another component collecting data as data to be included in the DataPack. The method can further comprise a derived data component or attachment.

In another aspect, the present invention relates to a method suitable for maintaining the state of the DataPack created by using a data capture device and the step of automatically populating data and Meta Data for the collection, the step of a user manually providing data to be included in the DataPack, or the step of providing another component collecting data as data to be included in the DataPack. The method can further comprise a derived data component or attachment.

In yet another aspect, the present invention relates to a method for collecting relevant data for a particular DataPack comprising the steps of providing parameters that can be used in the DataPack as Meta Data or context, determining if a user is adding data or modifying already provided data, capturing more data while the user adds more data or modifies already provided data, and auto-populating more data for the DataPack if the user no longer adds more data or modifies already provided data.

In yet a further embodiment, the present invention relates to a simple to use user interface that allows users to collect and correlate data to be provided as an input to the DataPack. In one embodiment, a conventional device is configured such that one or more of the input keys or other input devices such as a trackball or touch pad on the device are used to launch applications to collect and correlate data being inputted to a DataPack. In one embodiment, dedicated keys on a smartphone, or other handheld device like BlackBerry, are used to trigger the recording of voice or capturing images and videos. In a further embodiment, the left application key when pressed is the recording voice trigger, the right application key when pressed is the camera launcher for image or video capture, the keyboard is used for text entry, and a software library is provided as an engine to extract other relevant data for the DataPack. The apparatus provides an easy platform for users to follow methods described in this invention.

Aspects and features of the present application will become apparent to those ordinarily skilled in the art upon review of the following description of specific embodiments of an apparatus and method for creating, addressing and modifying related data in conjunction with the accompanying drawing figures.

In a further embodiment, the present invention relates to a method for creating a structured data collection comprising collecting at least two data components using a data capture device, assigning the same unique identifier to all of the data components, whereby the items of data identified by the same unique identifier form a bundle of data. At least one of the data components can be automatically populated by the data capture device. At least one of the data components can be manually inputted into the data capture device. The data component can either be collected in response to a request from the data collection device or can have previously been collected (or may be continuously collected) by a collecting module in communication with the data collecting device. The unique identifier can be the unique identifier of the data capture device, a timestamp, account information or an identifier queried from remote server communicating with the data capture device or can be a unique identifier generated from one or more the above identifiers. Once the bundle of data components is created, the individual data components can be updated and/or additional new data components added to the bundle. The data components can be an attachment. A second bundle of data can be associated to the first bundle of data as a derived attachment. The bundle of data can further includes the property of a state of the bundle and the step of maintaining the state of the bundle. At least one of the data components can be reviewed and/or modified prior to the step of assigning the unique identifier. The bundle can be sent (such as by email) to a depository location such as a server. The bundle can be addressed after its creation by using the unique identifier.

In another aspect, the present invention relates to a method of creating a data pack comprising: using a data capture device to collect data components and, assigning a unique identifier to data components to form a bundle of data components.

In a still further aspect, the present invention relates to a data capture device comprising: an electronic storage device for electronically storing data components, a data collection device for collecting data components, a processor communicatively linked to the electronic storage device and the data collection device; the processor including: an application for assigning a unique identifier to data components forming part of the same bundle of data components. The data capture device can be any suitable device for collecting data including a camera, keyboard, GPS hardware, accelerometer, or a microphone. The data components forming part of the same bundle can be stored in a folder on the storage device and the unique identifier can be assigned to the folder to identify the bundle.

BRIEF DESCRIPTION OF THE DRAWINGS

Embodiments of the present application will now be described, by way of example only, with reference to the accompanying drawing figures, wherein.

Like reference numerals are used in different figures to denote similar elements, where applicable.

DETAILED DESCRIPTION OF THE DRAWINGS

Embodiments of an apparatus and method for creating, addressing and modifying related data include the following aspects of the technique, either practised on their own, or in combination.

Figure 1:
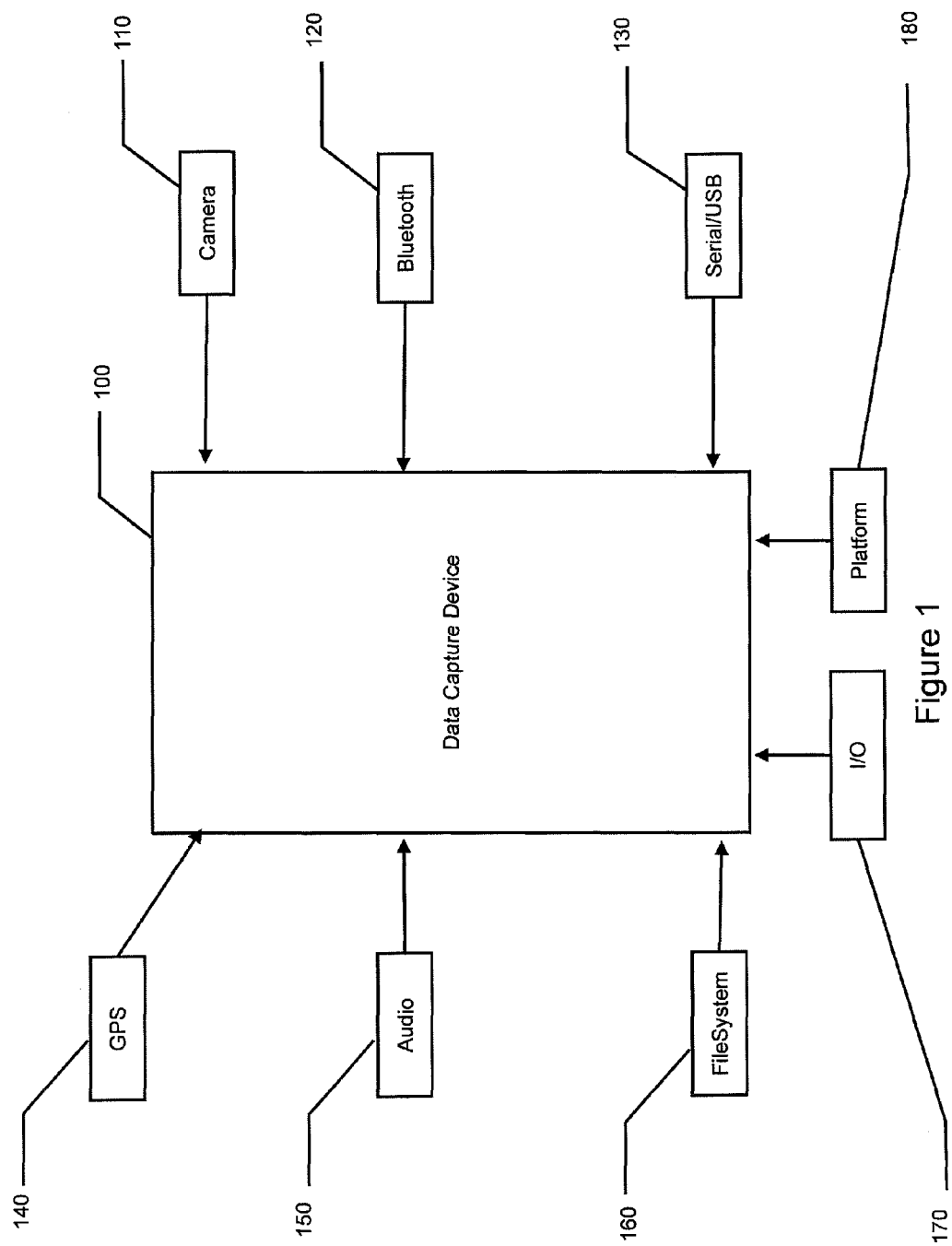
FIG. 1 depicts an embodiment of a data capture device with one or more sources of input.

Referring to the drawings, FIG. 1 depicts an embodiment of a data capture device with one or more sources of input. Several components are involved in collecting relevant data and possibly transmitting it to a server: A Data capture Device 100 may have access to sources of data, some of which are represented in the figure. An example of Data Capture Device would be a smartphone or a handheld device like BlackBerry or a Pocket PC. A built-in or an external camera 110 could be one possible source of data. The data could be an image or video that is captured by Camera 110 and made available to Data Capture Device 100 in some known format. This file may contain its own Meta Data which provides its own information about the data. Bluetooth 120 represents possible source of data from external devices which can communicate to Data Capture Device 100. This is not limited to Bluetooth technology, and could also include other technologies that enable wireless communication to peripheral devices. Serial/USB 130 represents possible source of data from external devices, which can communicate to Data Capture Device 100 over a cable. This is not limited to serial or USB technology, and could also include other technologies that enable communication to peripheral devices. GPS 140 represents a source of data that can provide location information to the Data Capture Device 100. This location information may be latitude/longitude along with other information collected using GPS devices like speed, direction, altitude etc. Additionally GPS 140 also represents other data, which helps in identifying the location, for example a cell ID, or WiFi location information. Audio 150 represents data that captures voice or other audio information. Like Camera 110, this also includes external capture device that provides audio data to Data Capture Device 100. File System 160 represents any data that is made available to the Data Capture Device 100, that had been stored in temporary or permanent memory. I/O 170 represents data that is provided by I/O like keyboard input. This includes possible context or TAGs that is retrievable by user interaction. Platform 180 represents the environment in which the Data Capture Device 100 is running. This could be data that the operating system, the hardware or a virtual machine provides.

In alternate embodiments, Data Capture Device 100 may be a custom application running on a server or a machine. The one or many data sources 110-180 could have an equivalent suitable for that environment. This will become apparent to those ordinarily skilled in the art upon review of the description of specific embodiments.

In another alternate embodiment, an application can be collecting one or more data inputs and make it available to the Data Capture Device 100, instead of the data sources directly providing data. For example, GPS 140 maybe collected periodically by a background task, so a recent GPS fix can be made available to Data Capture Device, for faster access to GPS fix.

Figure 2:
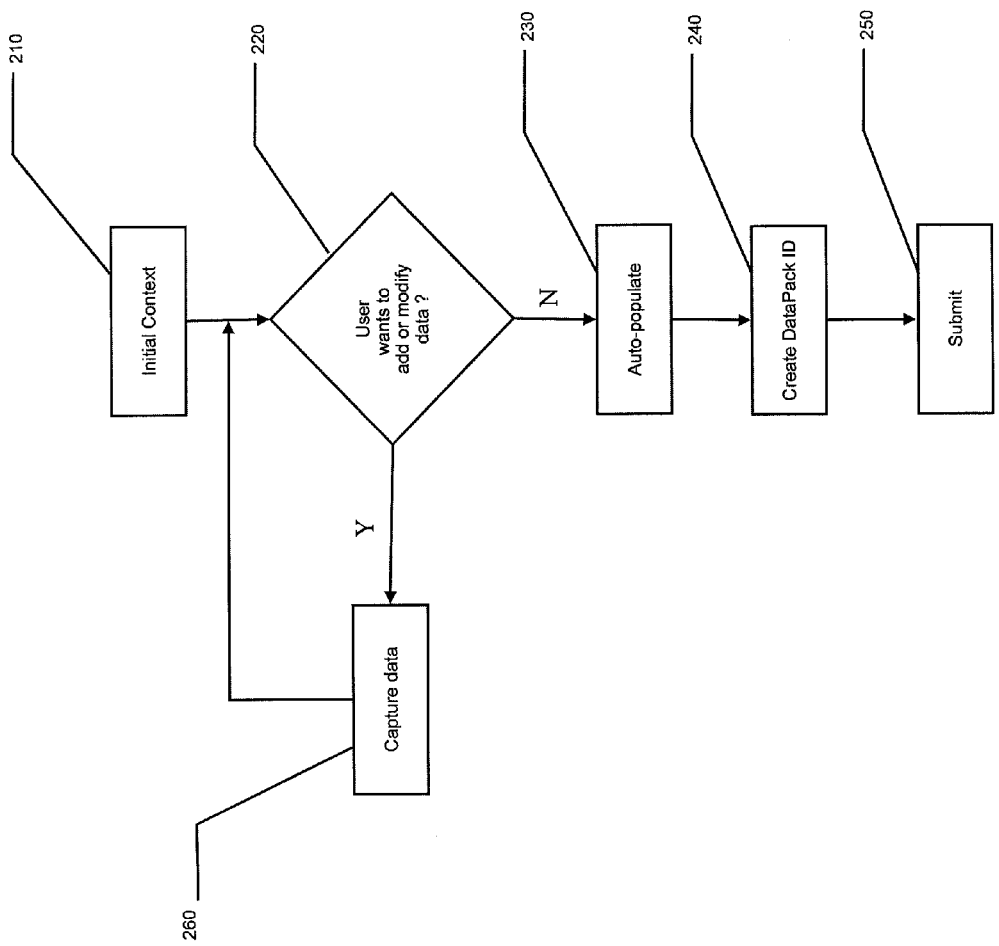
FIG. 2 depicts an example of the method according to the present invention for creating a "data pack" hereby also referred as a DataPack.

Referring to the next sheet of the drawings, FIG. 2 depicts an example of the method according to the present invention for creating a "data pack" hereby also referred as a DataPack. Initial context 210 is an opportunity for collecting relevant data for a particular DataPack. As a possible embodiment, when the application is brought into focus, it can extract or be provided parameters that can be used in the DataPack as useful Meta Data or context. 220 depicts the decision point in the flow to determine if the user intends to add or modify already provided data. While the users want to add or modify data the flow goes to 260 to capture more data. Once the user has nothing to change 220, we move on to step 230, which is another opportunity to auto-populate more data for the DataPack. An example would be to get the GPS location fix, using the timestamp or accelerometer data generated by an accelerometer attached to the device. By the time we reach Step 240, the data for the DataPack is ready and an ID is created to identify the DataPack. The DataPack is then submitted in step 250. On submission of the DataPack it can be queued and sent to its destination server which may happen immediately or at a later time based on connectivity.

In alternate embodiments, step 250 can be used as a trigger for step 230 and 240, where additional data is actually collected and made into a DataPack after user decides to do step 250.

In yet other embodiments, the initial context 210, may first query a remote database which could provide context for the current DataPack being created, for example pre-populating some of the fields, Meta Data, or options that would be included in the DataPack. This can also be repeated for more Capture data in 260. As a result this could be used for a new DataPack or modification update on a previous DataPack.

In alternate embodiments, step 230 can be autopopulating information while during step 220 and step 260.

Figure 3:
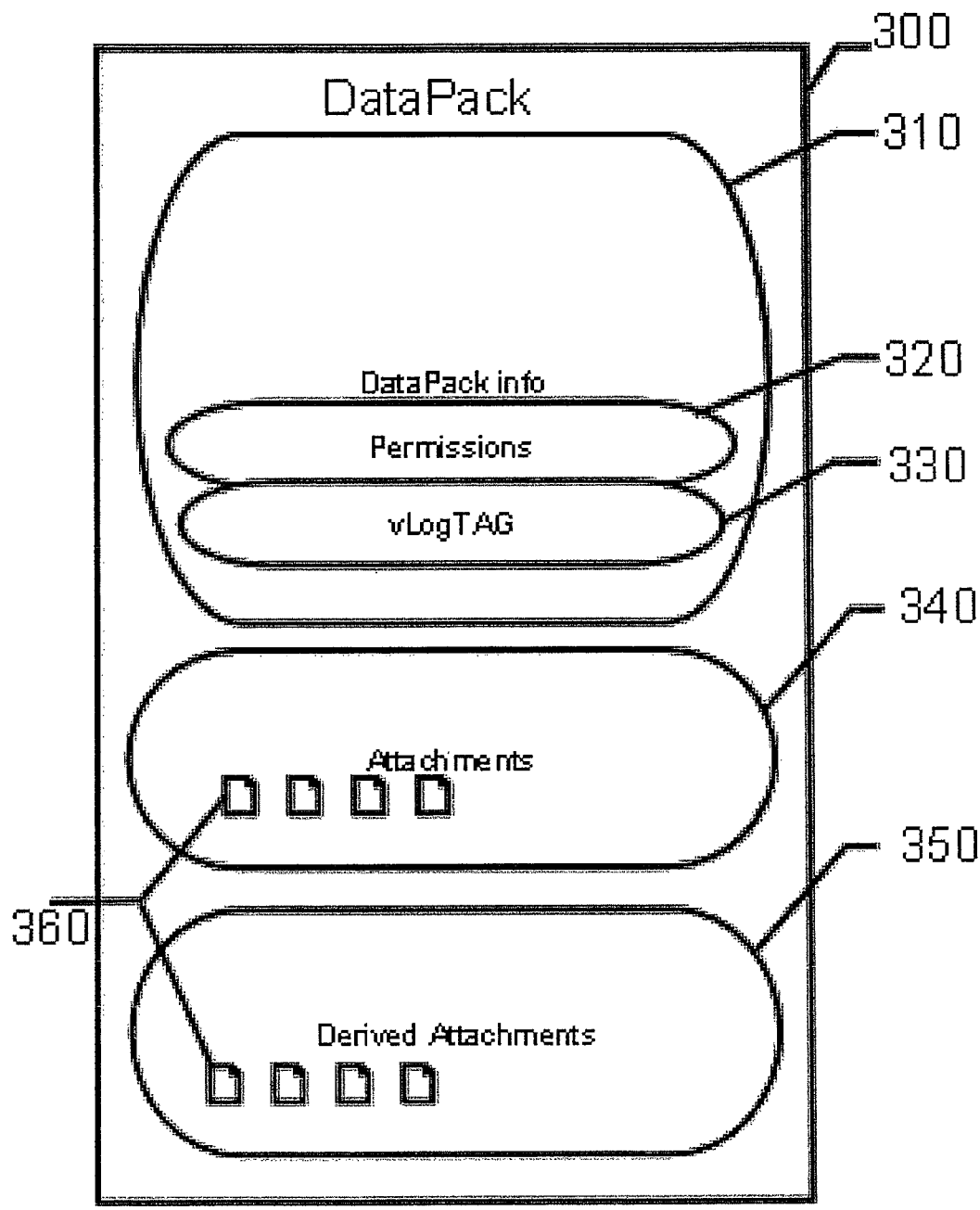
FIG. 3 depicts a logical structure DataPack.

Referring to the third sheet of the drawings, FIG. 3 depicts a logical structure DataPack. DataPack 300 is the encapsulating structure that includes components depicted in the FIG. 3. DataPack Info 310 represents the information pertaining to the DataPack as a whole. Examples of data in 310 includes, but is not limited to, Timestamp of DataPack Creation, GPS fix information of where DataPack was created, size of DataPack, last update on the DataPack, Additionally it can include Permissions 320 of which user or group is authorised to view, modify or delete. Since the data in DataPack may include data, which is collected over a period of time, DataPack info 310 could include vLogTAG 330, which includes a combination of timestamps with corresponding locations. It could also include custom events like RF signal strength, coverage quality, that occurred during that time period. This information can be later used to reproduce the sequence of events that occurred along with location information along with time. Attachments 340 may be included in the DataPack, which includes any type of attachments 360, including but not limited to, picture, audio files, text, documents, files, data logs, diagrams, screenshots. These attachments may within themselves contain Meta Data pertaining to the files themselves, e.g. a picture could have information about the type of camera used to take the pictures, and the camera settings.

In further embodiments, there could be Derived attachments 350, that were not necessarily present at the time of DataPack creation, but we associated with the DataPack at a later stage. For example, a voice attachment in 340, may go through an engine that can convert voice to text, and then be included as a derived attachment 350. In general, any data or tags that are included in the DataPack after the creation of the DataPack, will become part of the DataPack.

In alternate embodiments, 350 could include reference to other DataPacks can be auto-populating information while during step 220 and step 260.

In yet another embodiment, the DataPack can include the state of the DataPack, which could be as workflow information. For example, a DataPack can be created and marked as "pending approval". When the user with appropriate permissions marks this DataPack as approved, the state of the DataPack changes. This can be used to search for approved and "pending approval" DataPacks.

In some embodiments, multiple attachments 360 may have their own associated data information. For example, there can be multiple voice notes within a DataPack each having information about the data field with which the attachment is associated.

In yet another embodiment, the submission in step 250 may submit information about the DataPack or partial DataPack, optionally with derived attachments and Meta Data. It can also include an indication that the actual data is available and may be uploaded or made available at a later stage. As an example, and not limited to the following, a large video file attachment, may be deferred to be uploaded on submission, and only its thumbnail preview image may be uploaded as Derived attachments 350. Later upon suitable conditions, e.g. device being charged or in higher bandwidth coverage, it can submit the original attachment. There can be additional mechanism to "pull" this data for submission, when a server or other entity explicitly requests to view the attachment.

An example of a DataPack bundle according to the present invention can be created using a mobile device, such as a BlackBerry, which has a camera, keyboard, GPS hardware and a microphone. The data components being bundled can be pictures for example along with a video. A suitable application on the mobile keeps track of these media, and also attaches the location information obtained from the GPS. The user can also add some comments about the media. Additionally, a form generated showing multiple fields can be used for collecting other fields or automatically tagging or naming the voice file being recorded, based on the field currently highlighted in the application, while voice is being recorded. The application can also be recording the sequence of events, as in 330, which can be used for future playback of the sequence to create the DataPack. By the click of a button, this bundle can be sent via email or to a server over data channel, the DataPack identifier is then created. The DataPack identifier can be a string that includes the timestamp of when the DataPack was submitted for transmission, and the device's own unique identifier. Each of the files may be stored on a server location where the identifier of the DataPack bundle is a folder, and each of the files and notes are files within that folder.

What is claimed is:

1. A method for creating a structured data collection at a mobile data capture device, the method comprising:
   receiving an input from a interface of the mobile data capture device, the input activating a function for collection of data components;
   determining an initial context in response to the activation of the function for collection of data components;
   collecting, in response to receiving the input, at least two data components associated with at least the initial context using the mobile data capture device, wherein at least one of the data components is newly acquired by the mobile data capture device from a data source subsequent to receiving the user input and wherein at least one of the data components has an data component identifier;
   providing a unique identifier, and
   assigning the unique identifier to the at least two data components collected at the mobile data capture device, to form a bundle of data associated with at least the initial context and identified by the unique identifier on the mobile data capture device.

2. The method of claim 1, wherein the initial context is reset subsequent to formation of the bundle of data and a new initial context is determined for each subsequent activation of the function for collection of data components.

3. The method of claim 1, wherein at least one of the data components is manually inputted into the mobile data capture device and at least one of the data components is automatically populated by the mobile data capture device.

4. The method of claim 1, further comprising the step of collecting a data component from a data collecting module connected to the mobile data capture device where the data component has previously been collected by the collecting module.

5. The method of claim 1 wherein the unique identifier is selected from the group consisting of the unique identifier of the mobile data capture device, a timestamp, account information and an identifier queried from remote server communicating with the mobile data capture device.

6. The method of claim 1 wherein a further unique identifier is generated using one or more of the unique identifiers of claim 5.

7. The method of claim 1 further including the step of updating at least one of data components.

8. The method of claim 1 wherein at least one of the data components is selected from the group consisting of an image file, a video file, an audio file, a location, a tag and an attachment.

9. The method of claim 1 further including the step of associating a second bundle of data to the first bundle of data as a derived attachment.

10. The method of claim 1 wherein the bundle of data further includes the property of a state and the step of maintaining the state of the bundle.

11. The method of claim 1 further including the steps of reviewing and modifying at least one of the data components prior to the step of assigning the unique identifier.

12. The method of claim 1 further including the step of sending the bundle to a depository location.

13. The method of claim 1 further including the step of addressing the bundle after its creation using the unique identifier.

14. The method of claim 1 wherein the bundle is a data pack.

15. The method of claim 1, further including the step of playing back the bundle of data in the same sequence as it was acquired.

16. The method of claim 1 further including providing a form having at least one field and automatically tagging a data component based on the field.

17. A method of creating a data pack at a mobile data capture device, the method comprising:
   using a mobile data capture device to collect data components associated with at least an initial context in response to receiving an input at a user interface, wherein at least one data component has data component identifier and wherein at least one of the data components is newly acquired from a data source subsequent to receiving the input at the user interface;
   providing a unique identifier different than the data component identifier, and
   assigning the unique identifier at the mobile device to each of the collected data components to form a bundle of data components associated with at least the initial context and identified by the unique identifier on the mobile device.

18. A mobile data capture device comprising:
   an electronic storage device for electronically storing data components,
   a data collection device for collecting data components wherein at least one data component has data component identifier;
   a user interface for receiving selected input and generating an indication of the input;
   a processor communicatively linked to the interface, the electronic storage device and the data collection device;
   the processor including:
      an application activated by the processor in response to receiving the indication of the selected input from the interface, the application for
      determining an initial context in response to the activation of the application;
      collecting at least two data components associated with the initial context using the mobile data capture device, wherein
         at least one of the data components is newly acquired by the mobile data capture device from a data source subsequent to receiving the input at the user interface and
         wherein at least one of the data components has an identifier; and
      assigning a unique identifier at the mobile data capture device to the at least two data components associated with the initial context to form a bundle of data components associated with the initial context and identified by the unique identifier on the mobile data capture device.

19. The data capture device of claim 18 wherein the data collection device is selected from the group consisting of a camera, keyboard, GPS hardware, accelerometer, and a microphone.

20. The data capture device according to claim 18 wherein the data components forming part of the same bundle are stored in a folder on the storage device and the unique identifier is assigned to the folder.

21. The method of claim 17 wherein at least one of the data components is selected from the group consisting of an image file, a video file, an audio file, a location, a tag and an attachment.

* * * * *